United States Patent
Hoeft

(10) Patent No.: US 6,567,772 B1
(45) Date of Patent: May 20, 2003

(54) SYSTEM FOR DYNAMIC ANALYSIS OF HYDRAULIC PERFORMANCE IN A CAD FIRE SPRINKLER SYSTEM MODEL

(76) Inventor: David Hoeft, 6053 S. Quebec St., Ste. 100, Englewood, CO (US) 80111

( * ) Notice: Subject to any disclaimer, the term of this patent is extended or adjusted under 35 U.S.C. 154(b) by 0 days.

(21) Appl. No.: 09/447,331

(22) Filed: Nov. 22, 1999

Related U.S. Application Data

(60) Provisional application No. 60/109,581, filed on Nov. 23, 1998.

(51) Int. Cl.$^7$ .............................................. G06F 17/50
(52) U.S. Cl. .................. 703/1; 703/7; 703/9; 239/211; 340/515; 340/606
(58) Field of Search .............................. 703/1, 2, 6, 7, 703/9; 169/37; 239/211; 340/514, 515, 603, 606, 506; 137/80; 705/400

(56) References Cited

U.S. PATENT DOCUMENTS

| | | | | | |
|---|---|---|---|---|---|
| 5,139,044 | A | * | 8/1992 | Otten et al. .................... | 137/80 |
| 5,227,983 | A | * | 7/1993 | Cox et al. ....................... | 703/1 |
| 5,228,469 | A | * | 7/1993 | Otten et al. .................... | 137/80 |
| 5,557,537 | A | * | 9/1996 | Normann et al. .............. | 703/1 |
| 5,808,905 | A | * | 9/1998 | Normann et al. .............. | 703/2 |
| 6,081,196 | A | * | 6/2000 | Young ......................... | 340/606 |
| 6,239,708 | B1 | * | 5/2001 | Young ......................... | 340/606 |
| 6,333,689 | B1 | * | 12/2001 | Young ......................... | 340/506 |
| 6,333,695 | B2 | * | 12/2001 | Young ......................... | 340/606 |
| 6,446,053 | B1 | * | 9/2002 | Elliiott ....................... | 705/400 |
| 2001/0026225 | A1 | * | 10/2001 | Young ......................... | 340/606 |

OTHER PUBLICATIONS

Edgar, J.A. The Effectiveness of Fire Detection and Fire Sprinkler Systems in the Central Office Environment, Telecommunications Energy Conference, 1989, INTELEC '89, pp. 21.4/1–21.4/5.*

Meshkat et al., L. Analysis of Safety Systems with On–Demand and Dynamic Failure Modes, 2000 Proceedings, Annual Reliability and Maintainability Symposium, IEEE, pp. 14–21.*

Wellman et al., C.M. Sprinkler Systems in Electrical Control Rooms: Cause for Anxiety or Responsible Safety Design?, IEEE Transactions on Industry Applications, vol. 32, No. 1, Jan./Feb. 1996, pp. 25–30.*

Meshkat et al., L. Dependability Analysis of Systems with On–Demand and Active Failure Modes, Using Dynamic Fault Trees, IEEE Transactions on Reliability, vol. 51, No. 2, Jun. 2002, pp. 240–251.*

* cited by examiner

Primary Examiner—Russell Frejd
(74) Attorney, Agent, or Firm—Scott L. Terrell, P.C.

(57) ABSTRACT

A processing system for dynamic analysis of hydraulic performance in a computerized fire sprinkler system model is provided to aid sprinkler designers in auto-peaking the system when at least one of the elements are in a flowing hydraulic state, the system comprising storing in a first memory means a drawing view of a fire sprinkler system, the drawing comprised of a plurality of changeable interengageable system elements, representational of an actual construction, for selective assembly together, the elements having distinctive dimensional and operational properties including an open, closed or automatic flow, providing a remote area boundary for dynamic movement through the view, the remote area in operative connection with the automatic property, finding any one of the elements having an open-flow property, locating the boundary in the view, finding any one of the elements within the boundary having an automatic flow property, calculating a hydraulic result for at least one element using the open or automatic property or both, and displaying the hydraulic result for dynamic system analysis to determine an optimum location for the remote area in the drawing.

The invention further provides a processing system for dynamic analysis of hydraulic performance in a computerized fire sprinkler system model to aid sprinkler designers in optimizing the dimensional and material properties of delivery elements when at least one of the elements are in a flowing hydraulic state.

23 Claims, 12 Drawing Sheets

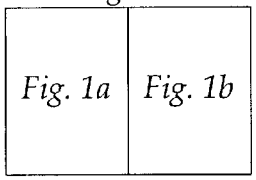
Fig. 1
*Fig. 1a*
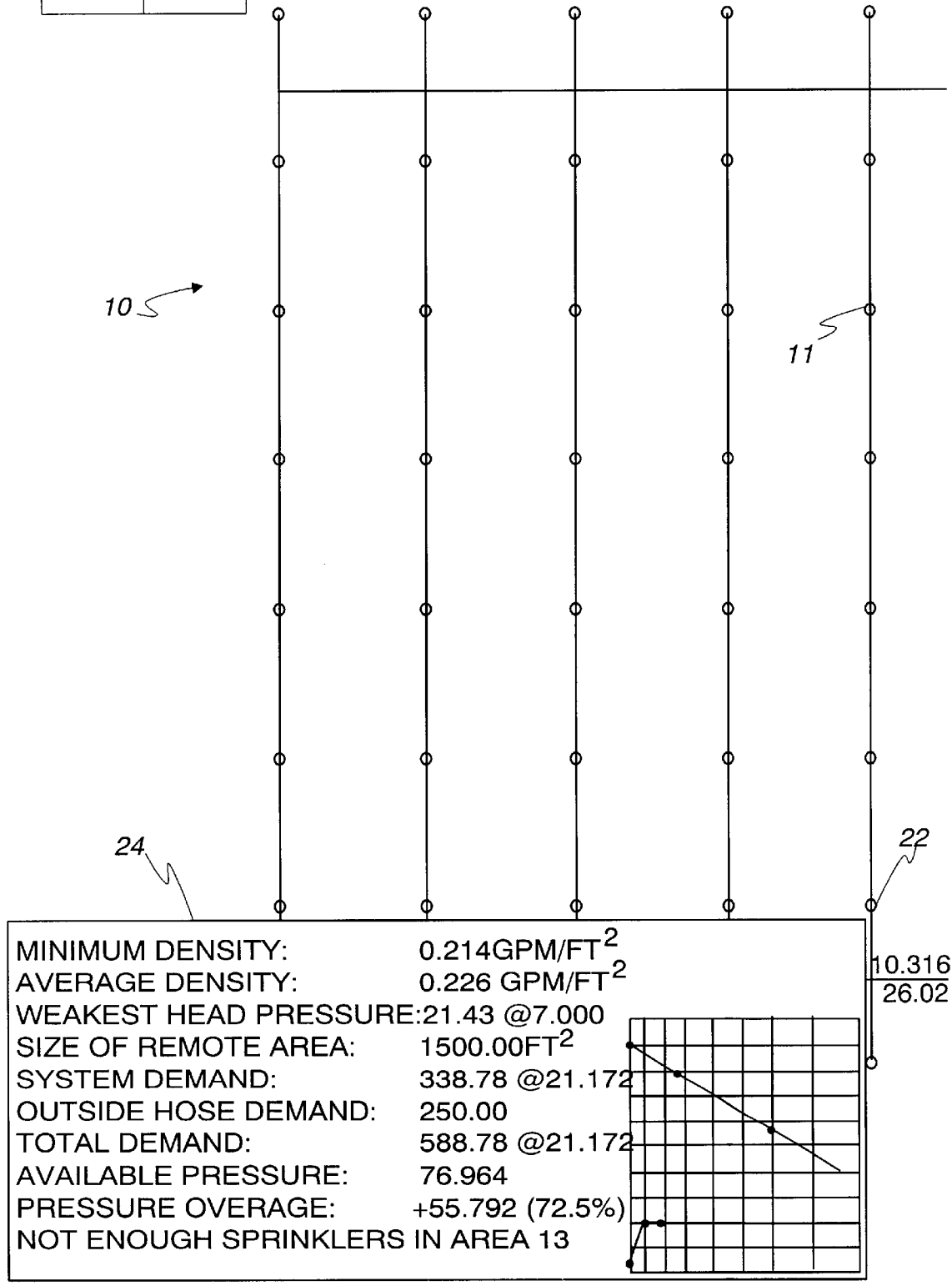

*Fig. 6b*

PIPE LIST

| TYPE | DIA (INCH) | COUNT | TOTAL LEN. (FOOT) | MAX VELOCITY (FT/SEC) |
|------|------------|-------|-------------------|------------------------|
| RN   | 1          | 8     | 16-0              | 21.74                  |
| BL   | 1          | 28    | 240-0             | 21.74                  |
| OL   | 1 1/2      | 4     | 20-0              | 0.00                   |
| CM1  | 2 1/2      | 1     | 30-8              | 14.18                  |
| CM2  | 2 1/2      | 1     | 30-8              | 10.49                  |

121

CURRENTLY SELECTED PIPE CHARACTERISTICS

| TYPE | BRANCH LINE |
|------|-------------|
| MATERIAL | SCHEDULE 30 |
| DIAMETER | 1 |
| ACTUAL INTERNAL DIA. | 1.0870 |

SELECT DRAWING ELEMENTS FROM HIGHLIGHTED ENTRY

SYSTEM SNAPSHOT

| CREATE A SNAPSHOT | RESTORE SNAPSHOT |

CURRENT DRAWING +55.860 (72.3%)
SNAPSHOT 1  +57.665 (74.6%)
SNAPSHOT 2  +58.147 (75.2%)

APPLY CHANGES TO THE DRAWING    CANCEL

SYSTEM FOR DYNAMIC ANALYSIS OF HYDRAULIC PERFORMANCE IN A CAD FIRE SPRINKLER SYSTEM MODEL

CROSS REFERENCE TO RELATED APPLICATIONS

Pursuant to 35 U.S.C. 119 (e)(1), Applicant claims the benefit of U.S. Provisional Application No. 60/109,581, filed Nov. 23, 1998 pursuant to 35 U.S.C. 111(b), and entitled: Method For Designing A Fire Sprinkler System.

BACKGROUND OF THE INVENTION

1. Field of the Invention

This invention relates to the computerized design of fire sprinkler systems, and in particular to the dynamic analysis of hydraulic performance in a computer aided drafting ("CAD") model.

2. Background of the Invention

Fire sprinkler distribution system are required in commercial and industrial buildings for the protection of the public in the event of a fire. Governmental entities and insurance companies have long recognized the need to adequately protect persons and property from catastrophic fires in memorializing sprinkler system design standards into their building codes, and as a condition of insurance coverage, respectively.

In designing a fire sprinkler system, the engineer must show the calculated hydraulic performance of the system, when one or more of the sprinkler system delivery elements are in a flowing hydraulic state. This showing typically requires sprinkler heads in one or more regions of the system to be "open", in relation to other flowing system elements such as hoses, hydrants, and nozzles. A requirement of the engineer is to determine which region of the system when the sprinklers within it are opened creates the greatest demand on the supplies to the system (the "remote area"), and to prove through mathematical calculations that the minimum required fire containment capability can be achieved. The shape and dimensions of the remote area are dictated by the building construction, the type of commodities stored within the area to be protected, and the relevant system design standards, such as NFPA-13. Thus, in complex irregular piping configurations determining the remote area can be very difficult to determine.

The engineer must also select the material and dimensional specifications for the water delivery piping which provide the optimum hydraulic performance according to the hazards to be associated with the building, or portion of the building to be protected. For example, pipes which are too small in diameter do not allow sufficient water flow through the system to provide adequate containment in the event of a fire. Conversely, the use of pipes which are too large in diameter will cause an excessive water flow through the system. Excessive flow reduces the overall fire fighting potential of the water supply in situations where multiple fire protection systems are flowing simultaneously. In addition, optimization of the material and dimensional properties of the pipe delivery elements of the system will often translate into a lower cost system, which enables the designer to submit a more competitive bid for the project.

The prior art discloses computerized methods for automatically designing the layout of a fire sprinkler distribution system. For example, U.S. Pat. Nos. 5,227,983, 5,557,537, and 5,808,905 disclose a method for designing and editing the distribution system for a building. Elements of the distribution systems and requirements of a relevant standard are stored in a computer memory. Building constructional features are manually entered into the computer. The user identifies the standard to be followed and the element to be optimized. The system divides the building into sections based on the user identified standard. The system then computes a layout needed to comply with the selected standard. The layout is routed and sized to avoid building structural members. Yet the elements of the layout are optimized for size and length. The design layout can be edited. The edited layout is checked for compliance with the identified standard as well as avoidance of building constructional features.

These methods do not, however, enable an engineer to selectively perform a quick dynamic analysis of the hydraulic performance of the system, or region of the system, as sprinkler heads are opened and closed, when one or more of the sprinkler system delivery elements are in a flowing hydraulic state. Thus, it would be difficult to determine which region of the system when the sprinklers within it are opened is the most remote area, and to prove through mathematical calculations of hydraulic performance that a minimum required fire containment capability can be achieved. The methods also do not provide a dynamic on-screen analysis of hydraulic performance for each element within a selected region, of the system, as pipe diameters are modified by the designer. The methods also require the designer to input the constructional features of a building prior to making any analysis of the system in order to optimize the pipe material and dimensional specifications. Finally, in the foregoing methods, the computer automatically sections building construction into remote design blocks, in computing the layout, based on the selected building standard. Physical elements of the sprinkler system are then automatically located within the predetermined section. Thus, editing operations of the elements are dependent upon the existence of a previously sectioned building layout, which is a confining approach when trying to ascertain the remote area of a system.

SUMMARY OF THE INVENTION

Accordingly, what is needed is a computerized fire sprinkler design system which provides a dynamic on-screen display of the calculated hydraulic performance of the system, or an element of the system, while opening and closing system elements when one or more of the system delivery elements in a flowing hydraulic state. The design system should allow the designer to dynamically determine which region of the system, when the sprinklers within it are opened, is the most remote area, and to thereby demonstrate that the minimum required fire containment capability can be achieved. The design system should also allow the designer to optimize the pipe delivery elements for use in an actual construction.

It is therefore an object of the invention to provide a fire sprinkler design system which provides a dynamic on-screen display of the calculated hydraulic performance of the system, or an element of the system, while opening and closing system elements when one or more of the system delivery elements in a flowing hydraulic state.

It a further object of the invention to provide a design system that will allow the designer to dynamically determine which region of the system, when the sprinklers within it are opened, is the most remote area.

It is yet another object of the invention to provide a design system which is useful to illustrate that a minimum required fire containment capability can be achieved for any selectable region of the system.

It is yet another object of the invention to provide a computerized design system that will provide for optimization of the pipe delivery elements by viewing the hydraulic performance of the system, or a selected group of elements of the system, for use in an actual construction.

These and other objects of the present invention will become apparent throughout the description of the invention which now follows.

Briefly, the invention provides a processing system for dynamic analysis of hydraulic performance in a computerized fire sprinkler system model to aid sprinkler designers in auto-peaking the system when at least one of the elements are in a flowing hydraulic state, the system comprising storing in a first memory means a drawing view of a fire sprinkler system, the drawing comprised of a plurality of changeable interengageable system elements, representational of an actual construction, for selective assembly together, the elements having distinctive dimensional and operational properties including an open, closed or automatic flow, providing a remote area boundary for dynamic movement through the view, the remote area in operative connection with the automatic property, finding any one of the elements having an open-flow property, locating the boundary in the view, finding any one of the elements within the boundary having an automatic flow property, calculating a hydraulic result for at least one element using the open or automatic property or both, and displaying the hydraulic result for dynamic system analysis to determine an optimum location for the remote area in the drawing.

The invention further provides a processing system for dynamic analysis of hydraulic performance in a computerized fire sprinkler system model to aid sprinkler designers in optimizing the dimensional and material properties of delivery elements when at least one of the elements are in a flowing hydraulic state, the system comprising storing in a first memory means a drawing view of a fire sprinkler system, the drawing comprised of a plurality of changeable interengageable system elements, representational of an actual construction, for selective assembly together, the elements having distinctive dimensional and operational properties including an open, closed or automatic flow, providing a remote area or system area boundary for dynamic movement through the view, the boundary in operative connection with the automatic flow property, finding any one of the elements having an open-flow property, locating the boundary in the view, collecting structural, dimensional and hydraulic data relative to at least one element in the boundary, finding any one of the elements within the boundary having an automatic flow property, calculating a hydraulic result for at least one element in the boundary using the collected data and the boundary; and optimizing the system by dynamically displaying the hydraulic result and the collected data for the element, and modifying the material or dimensions or both of the element for inclusion in the drawing.

Unless specifically defined otherwise, all technical or scientific terms used herein have the same meaning as commonly understood by one of ordinary skill in the art to which this invention belongs. Although any methods and materials similar or equivalent to those described herein can be used in the practice or testing of the present invention, the preferred methods and materials are now described.

DESCRIPTION OF THE DRAWINGS

The present invention is illustrated by way of example and not limitation in the accompanying figures in which like reference numerals indicate similar elements and in which.

DETAILED DESCRIPTION OF THE INVENTION

Figure 1B:
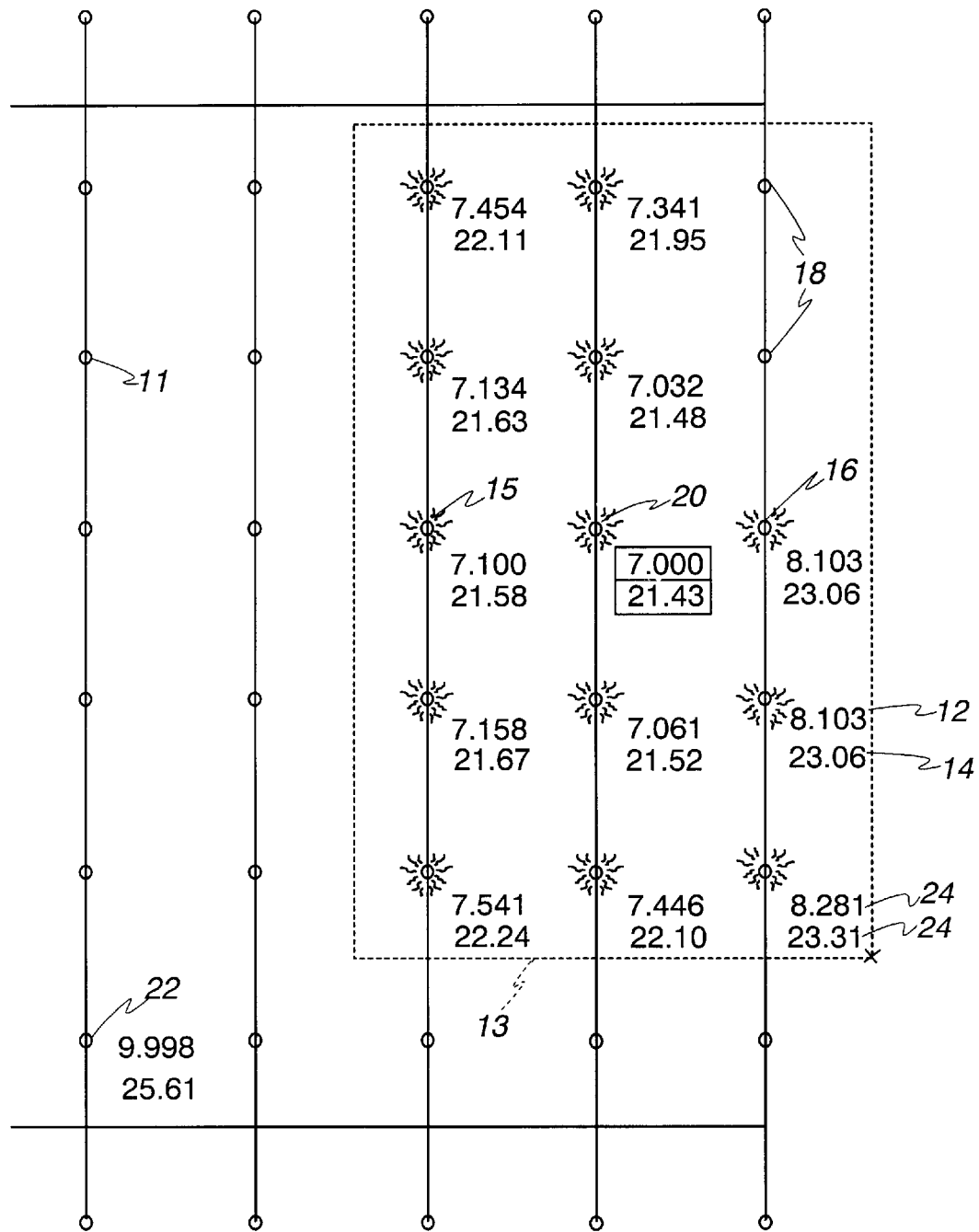
FIG. 1 is a top view of a typical grid system showing location of a remote area boundary for dynamic analysis of hydraulic performance in the system according to the preferred sequence shown in FIG. 2.

"Flowing elements or properties" means sprinkle system components such as sprinklers, nozzles, hoses, hydrants, and the like that can be operated to cause water to flow through the hydraulic system. When in operation, these elements represent a point at which water flows out of the hydraulic system, thus enabling water to flow from the supplies into the system.

"Open elements or properties" means sprinkler system components that have been configured to allow water to flow out of the hydraulic system. Open elements can potentially become flowing elements in a properly constructed system.

"Manually flowing elements" means devices that are specified to be open by the user, regardless of their position with respect to a remote area cursor.

"Automatically flowing elements or properties" means devices that are open when contained within the boundaries of a remote area cursor and closed when located outside of the boundaries of the remote area cursor.

"Remote area or boundary" means a region of the system that, when the sprinklers within it are opened, creates the greatest demand on the supplies to the system. The shape and dimensions of the remote area may be defined using the building construction, the type of commodities that will be stored within the protected area, and the relevant system design standards (e.g. NFPA-13).

"Remote area cursor" means the graphical representation of a two or three dimensional remote area that is manipulated by the user to dynamically open and close automatically flowing devices.

"System model" means a data structure representing a system of pipes, fittings, pumps, and other hydraulic system components which simulates the representational aspects and the physical properties of an actual piping system in accordance with the desired hydraulic performance of any selected element or group of elements comprising the system.

"Auto-peak" means an automated process for locating the optimum position for a remote area element. Auto-peaking is performed by incrementally moving a selected remote area of application along the branch lines that lie under it, the distance of each movement is equal to the sprinkler head spacing along the branch lines. At each incremental location, the hydraulic system is calculated. Once the most hydraulically demanding location for the remote area is determined, the remote area element is moved to that location.

The computer system for use in the design of the fire sprinkler distribution system comprises a display, such as a CRT, and a keyboard-type or scanning type input device operatively connected to a computer. The computer is preferably operatively linked to a plotter, a printer, and disk or tape type storage units.

The invention is implemented in a CAD program structure of a computer. The logical concept for describing components of the computer program are known as objects. An object is used to define the properties and interfaces of a system component. The computer program is an assembly of one or more objects. This object structure helps to clearly define and encapsulate the components of the computer program. The program uses "Object Oriented Programming" an industry standard practice, well know in the art, for program definition, design, and development. The objects herein, are implemented in C++ program code as classes. A class is a C++ programming language data structure that exists to implement the logical concept of an object. A class is used to encapsulate the data/properties and methods/interfaces of an object into a single data structure.

Three basic foundation structure programs are initially stored into the computer memory to implement the sprinkler design and optimization of the invention. First, Microsoft Foundation Program Structure is a program based upon the Microsoft standard Multi-Document Interface (MDI). This program model is built upon a base consisting of four fundamental objects: Application, Frame, Document, and View. The Application, sold under the trademark, MICROSOFT FOUNDATION CLASS LIBRARIES (MFC), provides these utilitarian objects and represents a program itself It is through the Application object that the process is initiated and all other objects that comprise the invention come into existence. The application creates the Frame, Document, and View objects. The Frame object represents the frame window of the Application that becomes visible to the user and acts as the manager for subsequent user interface objects, such as other windows. The Frame object encapsulates the internal data structures used by the operating system, sold under the trademark MICROSOFT WINDOWS®, to create and maintain an application's parent window. The Document object represents an instance of the user's data and is stored to disk for later retrieval. Many Document objects can exist for each instance of the program, enabling the program to open several documents simultaneously. The View object represents a view into the data of a Document object. The View object provides the user with a visual interface to the Document. The View object encapsulates the internal data structures used by the MICROSOFT WINDOWS® operating system to create and maintain an application's child window. Many View objects can exist for each Document object, enabling the program to display several different views of the same document simultaneously.

The second foundation program is a proprietary CAD foundation for the sprinkler system design software. This software comprises a set of programming objects that expands upon the MFC program structure. It adds capability to the MFC Application, Frame, Document, and View objects, enabling them to offer the fundamental behavior and interfaces of a CAD program. Many essential objects provided by this program support the needs of a CAD program. Derived from MICROSOFT MFG Objects, are an Application object necessary to support the CAD program, and a Frame object which establishes the parent window framework required to support the CAD program objects. A Document object is used to provide all the capability required to encapsulate CAD drawing data, which includes drawing elements and user settings appropriate to each drawing. A View object provides a visual interface to the document object. This View object provides the three dimensions view rotation and scaling properties, enabling the user to view the document's data from any arbitrary three dimension, view rotation, and magnification. It also provides for requesting three dimensional Cartesian coordinate (X,Y, Z) point input from the user. Input is provided by the system pointing device (mouse), the keyboard, or both. Also provided is a base class object of all CAD drawing elements, such as lines, arcs, circles, etc., that can be managed by the Document object and displayed by the View object. This object defines the interface to the CAD drawing elements that all derived classes inherited through standard C++ mechanisms. This standard interface enables the definition of the new kinds of elements for the CAD drawing, such as a pipe element derived from a line. The CAD foundation program further acts as the foundation program for the sprinkler design program.

The third foundation program is the program sold under the trademark DWG Unplugged®. This program is a collection of objects for reading, writing, and viewing DWG and DXF drawing files. This file format is well known in the art, the industry standard for the exchange of drawing files, and is used in the preferred embodiment of the invention. Using DWG Unplugged® objects, the above CAD foundation has the capability to read, write, and view DWG and DXF drawing files. This capability has been implemented in the CAD program Document and View objects. DWG and DXF drawing files can be read/appended to a CAD drawing, of the above program, and the CAD drawings may be stored on a data storage medium as DWG and DXF drawing files. Additionally, DWG and DXF drawing files can be selected as a backdrop to the current CAD drawing. This method enables the CAD program to make full use of the programs high-speed display objects to view DWG and DXF drawings. When the display must be refreshed, the background drawing is displayed first, immediately followed by the elements of the CAD drawing.

Figure 2:
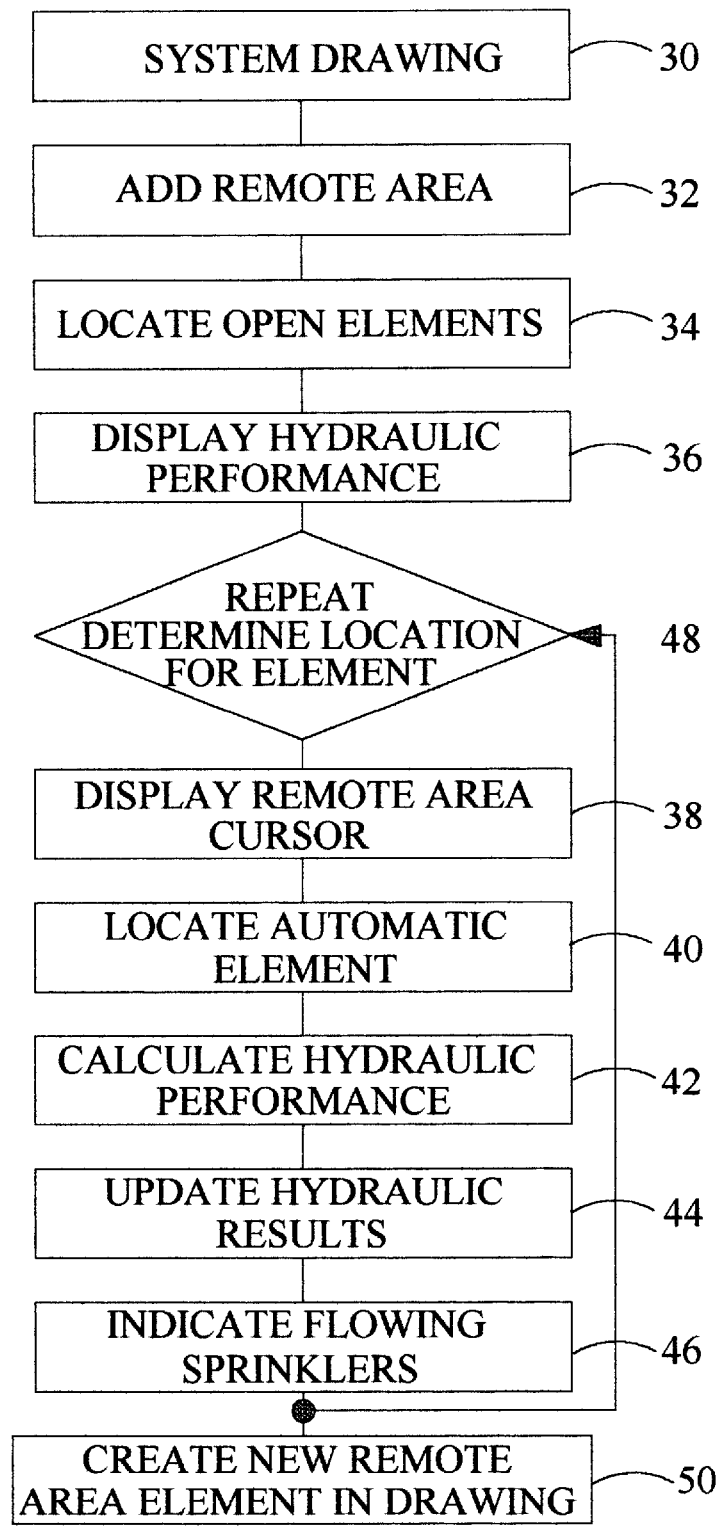
FIG. 2 is a preferred flowchart for dynamic system analysis by locating a remote area in relation to the drawing.

Turning now to FIGS. 1 and 2, wherein it is shown in FIG. 1 a graphic illustration of the results of those steps taken in FIG. 2, an initial representational design of a fire sprinkler system 10 may be created 30 by storing in a first memory means a drawing view 10 of a fire sprinkler system, the drawing comprised of a plurality of changeable interengageable system elements, such as sprinkler heads 11, representational of an actual construction, for selective assembly together, the elements having distinctive dimensional and operational properties including an open, closed or automatic flow property. An existing layout of elements is preferably added as a drawing 10 through the use of a design wizard. As used herein, a "wizard" means a standardized interface, well know in the art, for gathering large amounts of data from the user. It is presented as a Prev/Next/Finish sequence of pages. The effect of the wizards is to create repetitious grids of piping, in the drawing, which are typically found in systems of the desired designed. For example, at 30, it is preferable to provide a wizard to create each typical configuration of a system 10, such as a grid (shown), tree, loop, and in-rack.

In a preferred embodiment, the systems that are created by the wizard are constructed of the same elements that can be individually added and manipulated in the drawing. The resulting system is thereby easily modified to custom design a system that conforms to any special needs which may arise, resulting from the personal experience of the designer, or the necessity to comply with a rule or regulation, such as NFPA 13, which identifies different demand standards based upon the type of hazard associated with the use of the system. In the preferred embodiment, the user is provided with a selection of NFPA defined hazards. The user's selection of a hazard causes relevant default values to be loaded into the computer memory. After standard values have been loaded, the user is provided the option to edit those values according to any desired parameters. A properties subroutine (not shown) further provides the user an option to designate certain parameters desired to be associated with an element. For example, one may select an open (flow) 22, closed (off), or automatic property 16 to be associated with any sprinkler head 11.

In the figures, after creating 30 a drawing 10 having a new layout of elements or by loading an existing layout of elements, the user issues an "add remote area" command 32. All sprinklers 11, hoses, hydrants, and nozzles of the drawing 10 that are flowing on the basis that the respective properties have been set to "open" 22, are then located by the computer, at 34. The computer then determines and displays 36, graphically and numerically, the hydraulic performance of the system for display on a CRT.

Points 38–46, comprise a sequence of steps the user repeats in order to determine the desired location for inclusion of a remote area layout in the drawing. At 38, the user positions a mouse pointer at any location in the drawing for display of the remote area cursor 13. Devices within the remote area cursor 13 such as sprinklers 16 having an automatic properties designation are then located 40. The hydraulic performance of the system resulting from the open 22, or automatic 16, flowing fittings is then calculated 42, and the computer updates all graphic and numeric data which represent the hydraulic results 44. At 46, the computer visually indicates the flowing sprinklers, using lines 15 which extend in a radial manner from the sprinkler head, and provides a display which includes the outflow 14 and pressure 12 of the element. The weakest sprinkler 20 is also easily identified by highlighting the outflow 14 and pressure 12 relative to the sprinkler 20. These steps may be repeated 48 until a location in the drawing for the remote area element(s) 13 is determined by the user. The new remote area element(s) is then added 50 to the drawing at that location.

Figure 3A:
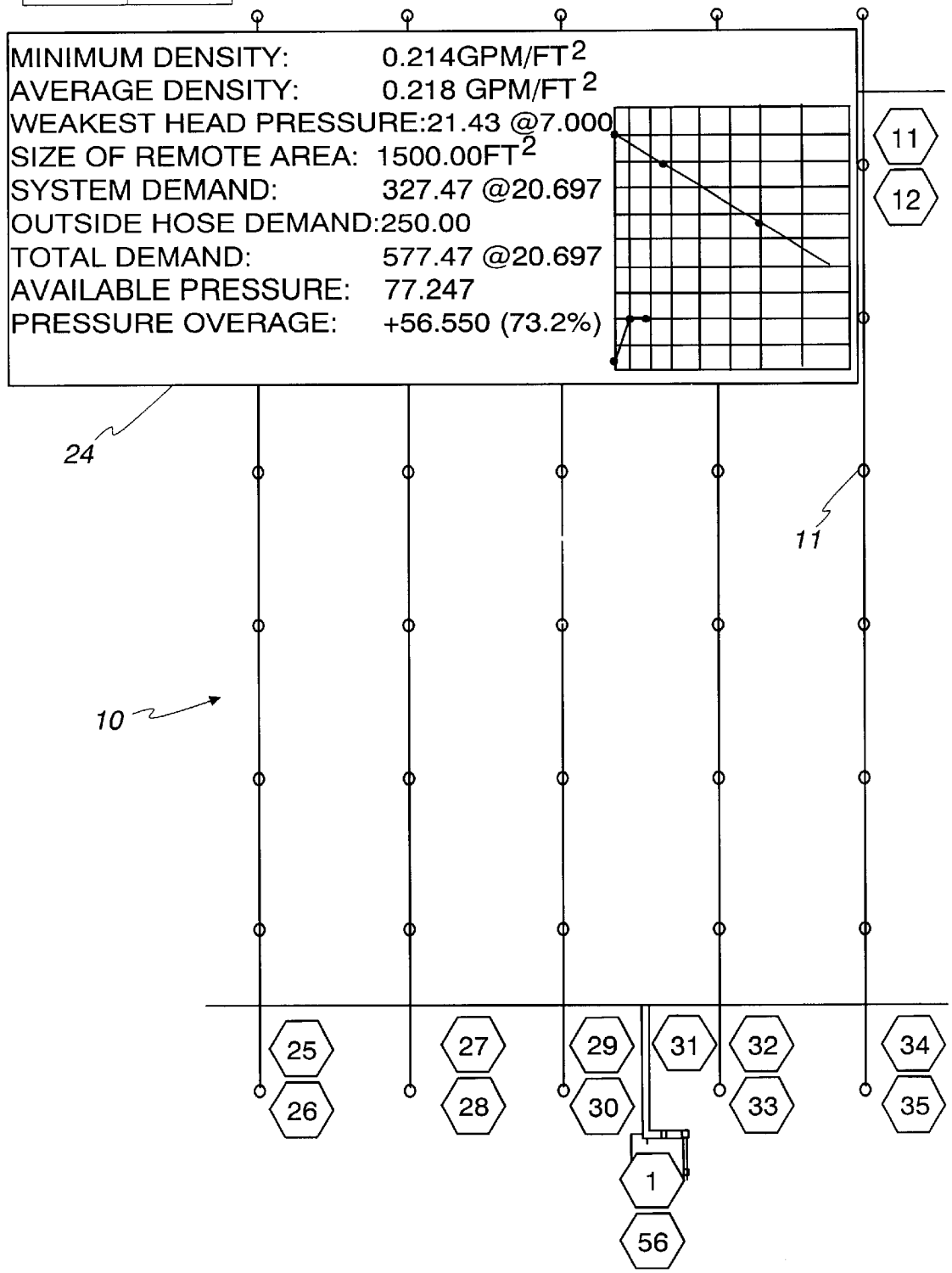
FIG. 3 is a drawing view showing dynamic analysis by dragging an existing remote area.
Figure 3B:
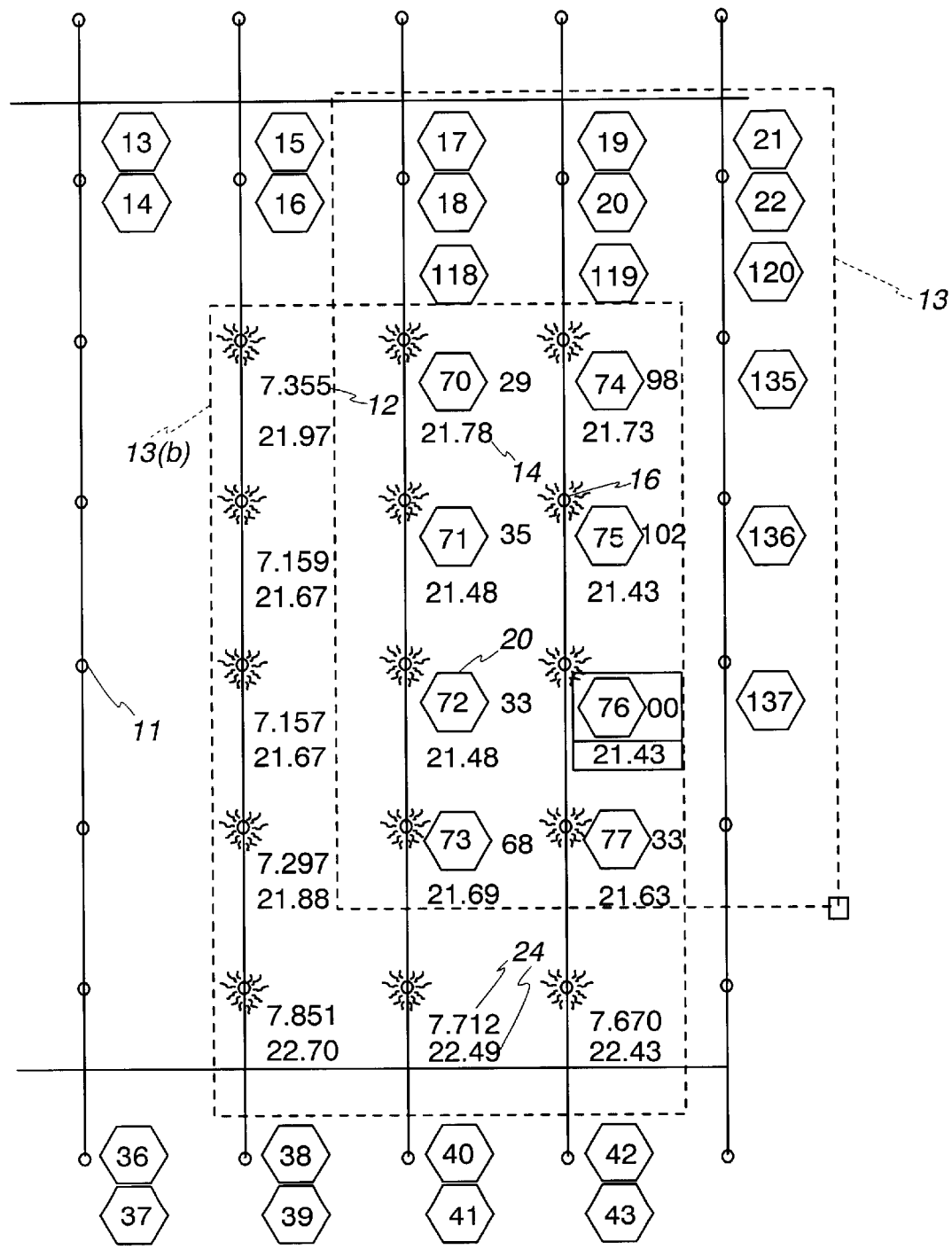

Editing the above drawing by optimizing the maximum hydraulic performance of a system comprises selecting an element, or layout of elements, and optimizing the design according to the hydraulic performance of the system. The invention uses several tools which provide of the selection of an element(s) for optimization of the system. The user moves the Remote Area element cursor 13, having a variably rectangular, or an L-shaped, region to select an area for editing. The goal is typically to identify the element(s) which comprise the most hydraulically demanding portion of the drawing. For purposes of collecting the hydraulic data, of the sprinkler system, sprinkler heads within the selected area 13 are treated as open (flowing), while sprinklers without the area are treated as closed. In FIG. 3, one can see that the user may easily drag the Remote Area cursor 13 around the drawing in order to circumscribe any assembly of elements 13(b) and to thereby update the hydraulic data display 24 for the element(s), within the area of the cursor 13(b), and the system of the drawing 10.

Figure 4A:
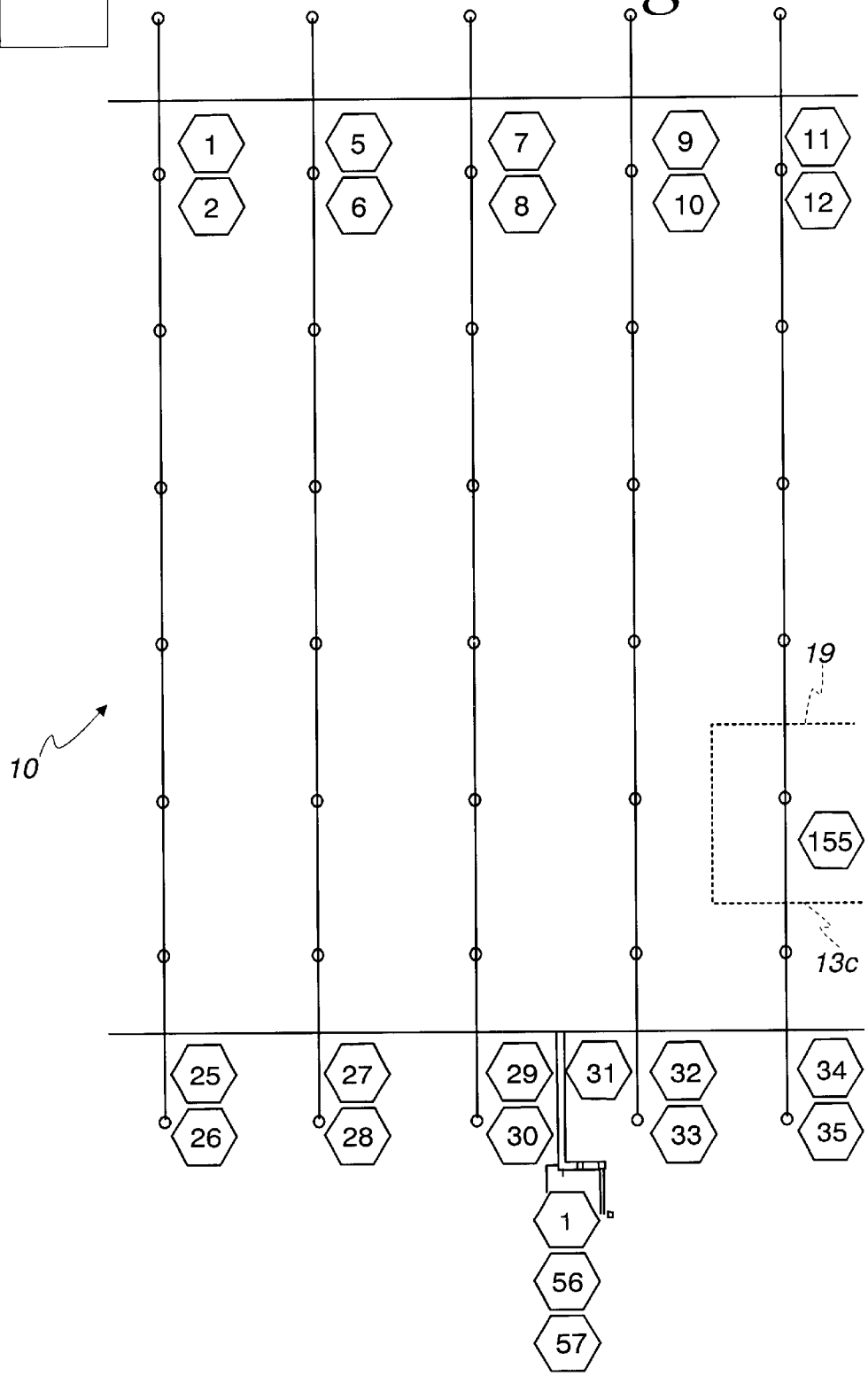
FIG. 4 is a drawing view showing use of a remote area cursor having a hole and an island. These three visible boundary lines are all parts of a single remote area element.
Figure 4B:
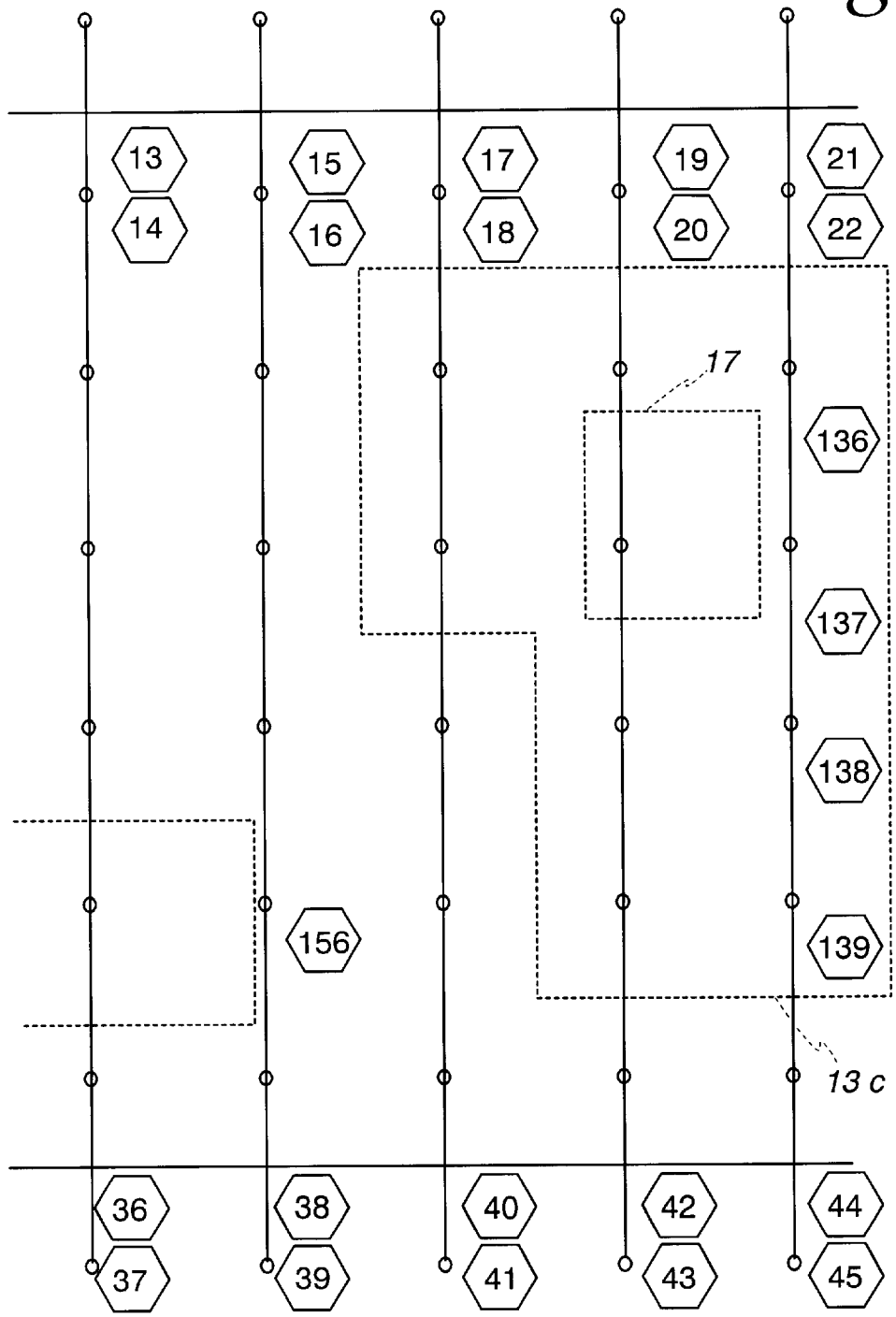

Referring now to FIG. 4, another selection tool is the Boundary Remote Area element 13(c), which may include holes 17 and islands 19 in the boundary 13(c). This remote area element enables the user to edit a design, according to the hydraulic performance of an element(s), in difficult configurations, such as where an obstruction occurs. In addition, the System Area element (FIG. 6, 62) may be used to isolate groups of elements in the drawing for a determination of the hydraulic performance of those elements. When the System Area element is used, only a report of the hydraulic data for elements contained within the system area boundary is output.

Figure 5:
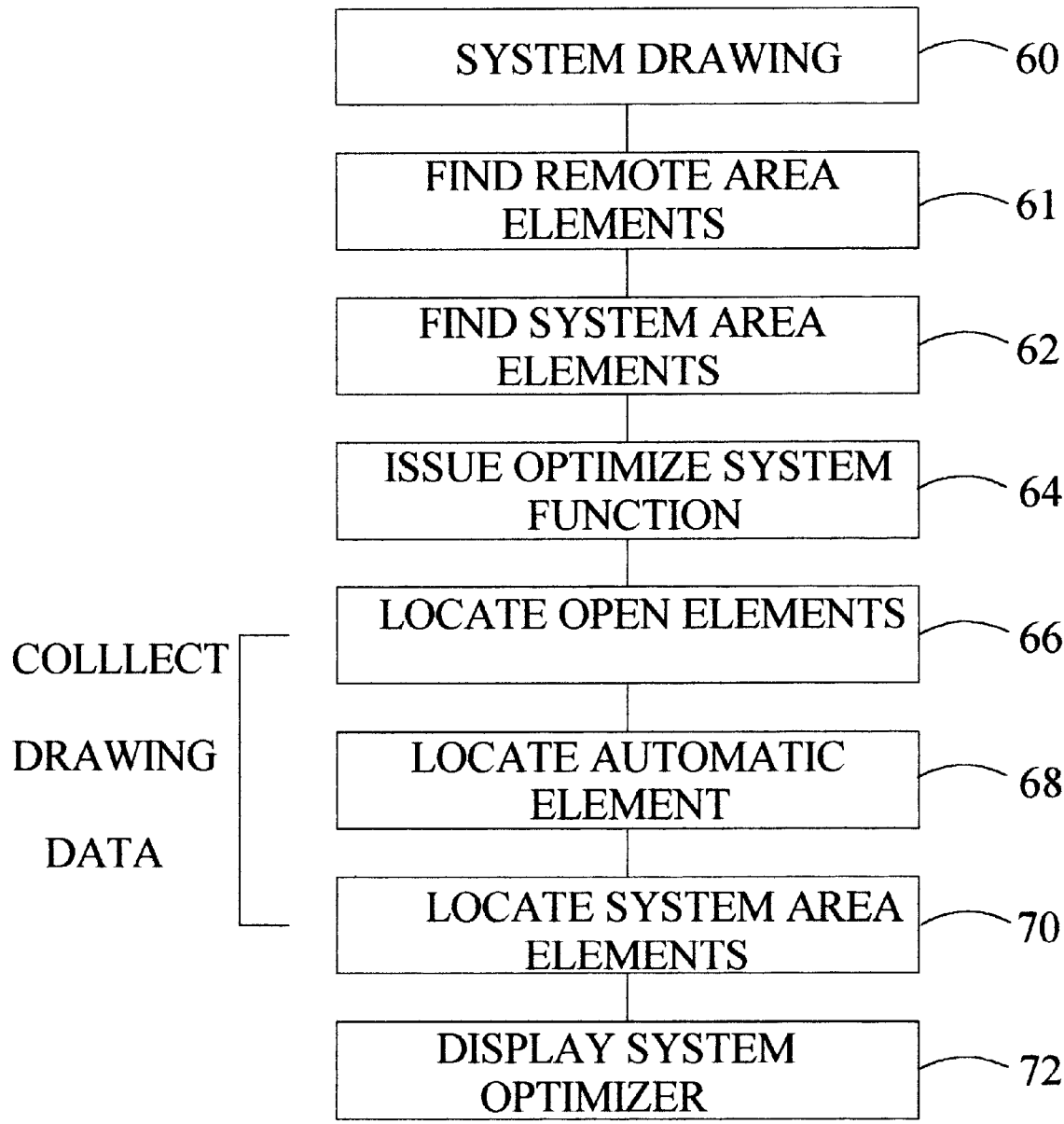
FIG. 5 is a preferred flow chart for dynamic optimization of the system using a remote or system area boundary.
Figures 6, 6A:
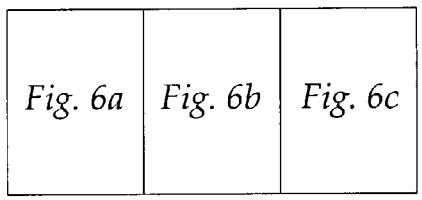
FIG. 6 shows the system optimizer dialog window visually oriented over a portion of the drawing view circumscribed by a remote area boundary. The listed elements are those within the system area.
Figure 6C:
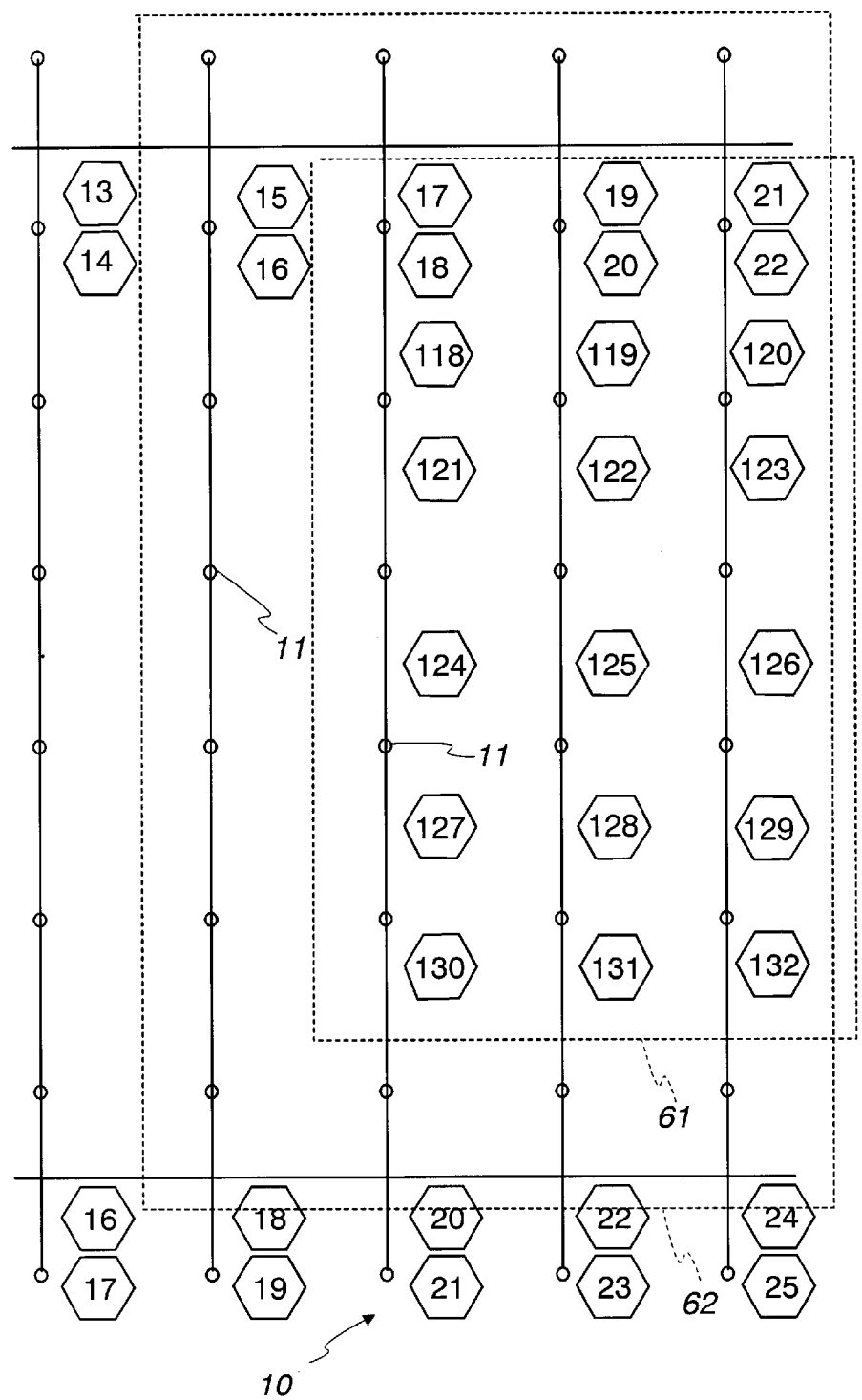

In FIG. 5, a flowchart of a preferred modification sequence for selecting an element(s) to be optimized in the drawing of FIG. 6 is shown. In the figures, as above, in 60, the user starts by creating a new element layout or by loading an existing layout 10 in the computer. Step 60 is often the result of points 30 or 50, in FIG. 2. The user then selects Remote Area elements 61, and/or System Area elements 62 for optimization. The user issues the optimizing system function 64, whereby the program collects element location data from the drawing 10 at points 66, 68, and 70. FIG. 6 illustrates that these groupings of pipes appear in a list box 121 in a system optimizer dialog window 120, as described below. At point 66, all sprinklers, hoses, hydrants, and nozzles that are flowing because their properties had been set to open are located 66. Elements within the selected Remote Area are then located in order to determine 68 which sprinklers are flowing as a result of an automatic properties designation. Next, selected System Area elements are located in order to determine 70 which pipes to display for editing and optimization. If there is no system area, all pipes are optimized. At point 72, the system optimizer submenu and dialog box is displayed.

There are many reasons to optimize a fire sprinkler system. An optimized system will cost less money, enabling the sprinkler system designer to make highly competitive bids. A system that is not optimized may demand far too much water, which is detrimental to other systems which operate off the same water supply. Worse yet, a system that is not optimized may provide inadequate protection of lives and property. The invention herein provides an effective way to optimize the fire sprinkler system. Once a drawing of the system has been created, the system optimizer tool is used. As above, the flowing state of the system is determined by which devices are open. Automatic sprinklers that are contained in selected remote areas will also be calculated as open. Hydraulic performance of the system is displayed graphically and numerically on the display, throughout this editing step.

The system optimizer, provides for a quick tune of the sprinkler system in order to achieve the desired optimum hydraulic performance. Hydraulic performance is determined for the entire system, a selected element, or group of element, in relation to the overall demand characteristics. These characteristics are displayed for any selected item and include: static pressure, as a function of water flow; system pressure demand; system flow demand; total outside hose demand; and the total overage. Calculation of the hydraulic performance, is well known in the art, includes various factors, such as, density per area, rules of NFPA 13, Hazan-Williams coefficient, and the K factors for the heads. A Newton-Raphson analysis is also performed wherein the computer may evaluate: minimum water pressure needed for the selected element(s); the flow at any given input pressure; or the flow at the given input flow. Optimum hydraulic performance, or total pressure overage of the system, is the difference between the total demand of the system or element(s), and the available water supply.

Figure 7:
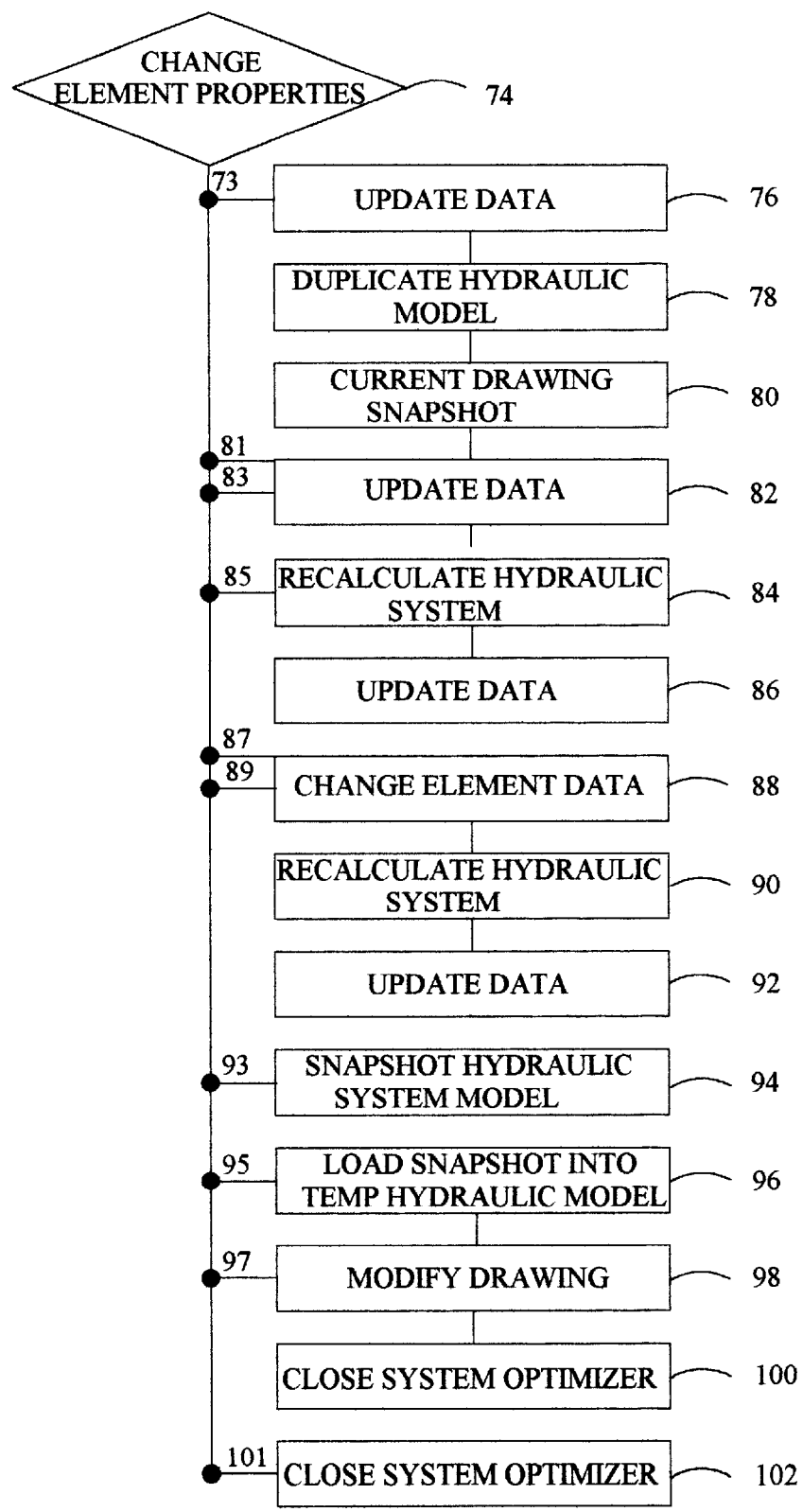
FIG. 7 is a preferred flowchart for the optimization of selected pipes based on the dynamic analysis of hydraulic performance using the flowing elements.

In FIG. 7, point 74 provides a preferred sequence having several editing options at the node points, for the user to select in order to change the elements physical properties, arrangement, and aspects in relation the desired optimum hydraulic performance of the system. The initiates 73 subroutine updates 76 the graphic and numeric data on the dialog, creates a 78 temporary duplicate of the current hydraulic system data model, and creates 80 an initial current drawing snapshot from the hydraulic system model. A pipe list item 81, or a supply list item 82, may also be input from the drawing for use to update 82 the graphic and numeric data for display on the dialog. A change 85 in hose flow first recalculates the temporary hydraulic system with the new specified outside hose flow 84, and then updates 86 the pertinent graphic and numeric data on the dialog. In order to change the pipe material 87, or change the pipe diameter 89, a change 88 is made to the pipe data in the temporary hydraulic system data model, and the computer revises the calculation based on the new outside pipe data 90, and updates 92 the graphic and numeric data on the dialog box. A snapshot 93 option allows the user to make 94 a snapshot of the temporary hydraulic system model. At 95, the user may also select the restore snapshot option whereby the data is loaded 96 into the temporary hydraulic system model from the hydraulic system model snapshot. Modifying the drawing according to the changes made is now an option provided at 77. Here, the drawing is modified 98 to match the temporary hydraulic system model, and the system optimization dialog is closed at point 100. A final option of the optimization subroutine provides for the user to select cancel of this subroutine 101 which also closes 102 the optimization and discards changes to the temporary system.

On-line report dialogs and a color-coded piping display are preferably used to enable the user to easily visualize the hydraulic data collected for an element(s). For example, pipes flowing at different velocities are distinctly colored according to the respective flow rates, pressure, velocity and flow of liquid within the pipe. An output of the drawing is generated to simulate a fire sprinkler system layout having the desired hydraulic performance, together with a list of the elements, for use by the architect or engineer in an actual construction.

While the present invention has been illustrated and described with reference to particular structures and methods of fabrication, it will be apparent that other changes and modifications can be made therein within the scope of the present invention as defined by the appended claims.

I claim:

1. A processing system for dynamic analysis of hydraulic performance in a computerized fire sprinkler system model to aid sprinkler designers in auto-peaking the system when at least one of the elements are in a flowing hydraulic state comprising:
    (a) storing in a first memory means a drawing view of a fire sprinkler system, the drawing comprised of a plurality of changeable interengageable system elements, representational of an actual construction, for selective assembly together, the elements having distinctive dimensional and operational properties including an open, closed or automatic flow;
    (b) providing a remote area boundary means for dynamic movement through the view, the remote area in operative connection with the automatic property,
    (c) finding any one of the elements having an open-flow property;
    (d) locating the boundary in the view;
    (e) finding any one of the elements within the boundary having an automatic flow property;
    (f) calculating a hydraulic result for at least one element using the open or automatic property or both; and
    (g) displaying the hydraulic result for dynamic system analysis to determine an optimum location for the remote area in the drawing.

2. The system of claim 1 further comprising including the remote area in the drawing at the location to be determined.

3. The system of claim 1 further comprising storing, in digital form in a third memory means, input data operatively connected to the first and second memory means, the input data including constructional features, such as parts of a building, and the physical characteristics of a building of desired appearance, and selectively interengaging the elements to display a representational drawing of the fire sprinkler system relative to the constructional features.

4. The system of claim 1 further comprising storing in a second memory means at least one hydraulic parameter.

5. The system of claim 4 wherein the boundary is determined using the parameter.

6. The system of claim 4 wherein the parameter is a minimum pressure or flow rate for a hazard to be contained.

7. The system of claim 1 further comprising after calculating visually indicating a respective hydraulic result with the element in the drawing.

8. The system of claim 7 wherein indicating comprises an illustration which represents a dispersion flow about a sprinkler element.

9. The system of claim 7 wherein indicating comprises a pressure or flow rate or both relative to the element.

10. The system of claim 7 wherein indicating further comprises a means for distinguishing a sprinkler element having a least pressure or flow rate.

11. The system of claim 1 wherein the boundary comprises a moveable cursor means.

12. The system of claim 1 wherein the boundary is defined by a second remote area.

13. The system of claim 1 wherein the boundary further includes islands or excludes holes or both, and the remote area includes those elements within the boundary.

14. The system of claim 1 wherein dynamic movement through the view comprises live analysis of the hydraulic results by dragging the remote area boundry through the view using an input means.

15. A processing system for dynamic analysis of hydraulic performance in a computerized fire sprinkler system model to aid sprinkler designers in optimizing the dimensional and material properties of delivery elements when at least one of the elements are in a flowing hydraulic state comprising:
    (a) storing in a first memory means a drawing view of a fire sprinkler system, the drawing comprised of a plurality of changeable interengageable system elements, representational of an actual construction, for selective assembly together, the elements having distinctive dimensional and operational properties including an open, closed or automatic flow;
    (b) providing a remote area or system area boundary means for dynamic movement through the view, the boundary in operative connection with the automatic flow property;
    (c) finding any one of the elements having an open-flow property;
    (d) locating the boundary in the view;
    (e) collecting structural, dimensional and hydraulic data relative to at least one element in the boundary;

(e) finding any one of the elements within the boundary having an automatic flow property;

(f) calculating a hydraulic result for at least one element in the boundary using the collected data and the boundary; and (g) optimizing the system by dynamically displaying the hydraulic result and the collected data for the element, and modifying the material or dimensions or both of the element for inclusion in the drawing.

16. The system of claim 15 further comprising storing, in digital form in a third memory means, input data operatively connected to the first and second memory means, the input data including constructional features, such as parts of a building, and the physical characteristics of a building of desired appearance, and selectively interengaging the elements to display a representational drawing of the fire sprinkler system relative to the constructional features.

17. The system of claim 15 further comprising including the modified element in the drawing.

18. The system of claim 15 wherein the structural, dimensional and hydraulic data is assembled as a group like elements determined according to the elements structure and dimension, and optimizing the material or diameter or both is made in relation to the group.

19. The system of claim 15 wherein the group is further subdivided according to an operational characteristic.

20. The system of claim 15 wherein the displayed dimensional data includes an inside diameter.

21. The system of claim 15 wherein displaying comprises a graphic or numeric report.

22. The system of claim 15 further comprising automatically creating a snapshot view when optimizing.

23. The system of claim 15 wherein the selected remote area elements are automatically auto-peaked after including the pipe element in the drawing.

* * * * *